US007980876B2

(12) United States Patent
Bombale et al.

(10) Patent No.: US 7,980,876 B2
(45) Date of Patent: Jul. 19, 2011

(54) LOCK FOR MOBILE COMMUNICATION EQUIPMENT

(75) Inventors: Annappa Bombale, Karnataka (IN); Murali Mohan, Karnataka (IN); Sadhu Sharan Prasad, Bihar (IN); Siddharth Gaikwad, Maharashtra (IN)

(73) Assignee: Sasken Communication Technologies Limited, Bangalore (IN)

( * ) Notice: Subject to any disclaimer, the term of this patent is extended or adjusted under 35 U.S.C. 154(b) by 753 days.

(21) Appl. No.: 12/015,837

(22) Filed: Jan. 17, 2008

(65) Prior Publication Data

US 2008/0113637 A1 May 15, 2008

(51) Int. Cl.
*H01R 13/62* (2006.01)
*H01R 13/625* (2006.01)
*G06K 7/00* (2006.01)
*H04B 1/08* (2006.01)
*H04B 1/38* (2006.01)
*G06F 7/04* (2006.01)
*G06F 12/00* (2006.01)
*G06F 12/14* (2006.01)
*G06F 13/00* (2006.01)
*G06F 17/30* (2006.01)
*G06F 1/26* (2006.01)
*G06F 11/00* (2006.01)
*G11C 7/00* (2006.01)
*G08B 13/00* (2006.01)
*G08B 21/00* (2006.01)
*G08B 29/00* (2006.01)

(52) U.S. Cl. ........ 439/301; 235/486; 438/304; 438/345; 455/347; 455/558; 726/20; 726/35

(58) Field of Classification Search .................. 235/486; 439/301, 304, 345; 455/347, 558; 726/20, 726/35
See application file for complete search history.

(56) References Cited

U.S. PATENT DOCUMENTS

| 4,526,433 A * | 7/1985 | Tanaka ........................... 439/301 |
| 6,261,113 B1 * | 7/2001 | Chen ............................... 439/260 |
| 7,059,911 B2 * | 6/2006 | Uchida et al. .................. 439/630 |
| 7,438,599 B2 * | 10/2008 | Uchida et al. .................. 439/630 |
| 7,613,480 B2 * | 11/2009 | Brown ........................... 455/558 |
| 7,651,356 B2 * | 1/2010 | Nguyen et al. ................. 439/301 |
| 2003/0069040 A1 * | 4/2003 | Chuang et al. ................. 455/558 |
| 2005/0075138 A1 * | 4/2005 | Page et al. ...................... 455/559 |
| 2005/0159184 A1 * | 7/2005 | Kerner et al. .................. 455/558 |
| 2005/0172969 A1 * | 8/2005 | Ging et al. ............... 128/206.24 |
| 2006/0055506 A1 * | 3/2006 | Nicolas .......................... 340/5.1 |
| 2009/0117011 A1 * | 5/2009 | Morrison ....................... 422/102 |

FOREIGN PATENT DOCUMENTS

DE 19957119 A1 * 5/2001
WO WO 0139101 A1 * 5/2001

* cited by examiner

*Primary Examiner* — Dwayne D Bost
*Assistant Examiner* — Larry Sternbane
(74) *Attorney, Agent, or Firm* — Schwegman, Lundberg & Woessner, P.A.

(57) ABSTRACT

A system includes an integrated circuit card, a tray configured to receive the integrated circuit card, a connector, and a housing configured to receive the connector. The housing is configured to attach to a mobile communication device, the connector is configured to couple the tray and the integrated circuit card to the mobile communication device, the tray includes one or more one way snaps that are configured to lock the tray and the integrated circuit card to one or more of the connector, the housing, and the mobile communication device, and the tray includes a means for engaging and damaging one or more leads on the connector when attempts are made to disengage the tray and the integrated circuit card from the connector.

25 Claims, 8 Drawing Sheets

LOCK FOR MOBILE COMMUNICATION EQUIPMENT

TECHNICAL FIELD

Various embodiments relate to the field of mobile communication devices, and in an embodiment, but not by way of limitation, to a lock for a mobile communication device.

BACKGROUND

Mobile communication devices, such as mobile or cellular phones, can include thousands or even millions of integrated circuits. Such circuits can be grouped onto one or more cards referred to as integrated circuit cards. For example, a mobile phone typically includes a subscriber identity module (SIM). The SIM card can include information such as an identifying telephone number that is associated with the mobile communication device, carrier information, and a service subscriber key. If the SIM card is removed and replaced with a new SIM card, the carrier associated with that telephone can be changed. This can cause economic hardship to a service provider, for example in the case where the service provider supplies the telephone at no charge to the customer, and the customer then replaces the SIM card so that the telephone can be used with a different service provider.

DETAILED DESCRIPTION

Figure 1:
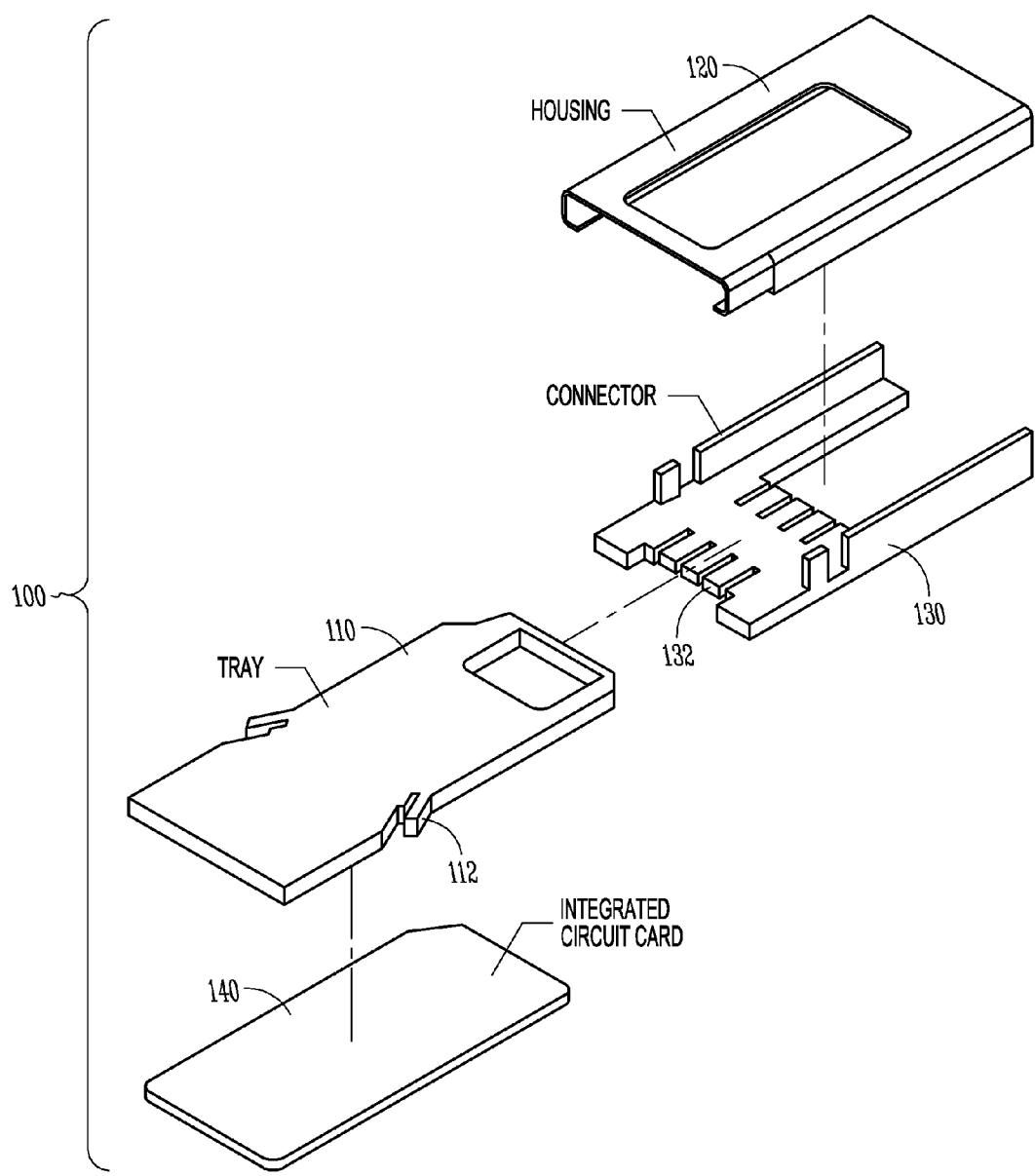
FIG. 1 illustrates an exploded view of an example embodiment of a lock for a mobile communication device.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Embodiments of the invention include features, methods or processes embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.)).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include digital/analog signal processing systems, software, data processing hardware, data processing system-implemented methods, and various processing operations, further described herein.

One or more figures show block diagrams of systems and apparatus of embodiments of the invention. One or more figures show flow diagrams illustrating systems and apparatus for such embodiments. The operations of the flow diagrams will be described with references to the systems/apparatuses shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

In an embodiment, a slot is provided in a mobile communication device such as a cell phone. The slot is for receiving an integrated circuit card such as a subscriber identity module, or SIM card. The SIM card allows some degree of personalization of a phone, such as selecting a particular phone number and/or selecting a particular cell phone. The SIM card can be placed in a tray that has selected locking and damage-causing features, and both can easily be inserted into the slot in the cell phone such that the SIM card cannot be removed without damaging the slot or cell phone. The slot contains a connector and housing that like the tray includes selected locking and damage-causing features to prevent users from swapping a SIM card out of the cell phone and thereby changing service providers.

Figure 6:
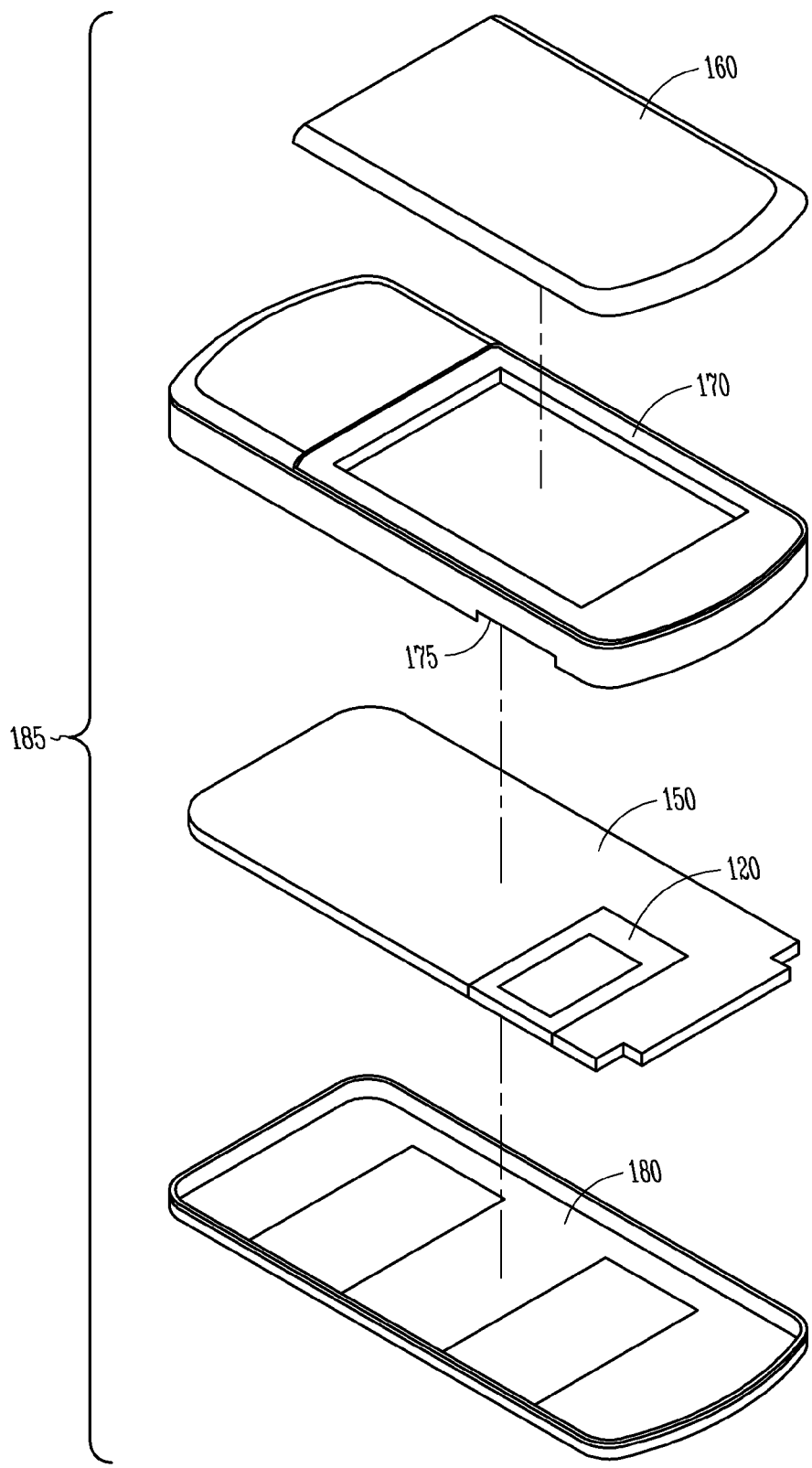
FIG. 6 illustrates an exploded view of an example embodiment of a lock and a mobile communication device.

FIG. 1 is an exploded view of a system of a lock 100 for a mobile communication device such as a mobile telephone, a cellular telephone, or other handheld device. The system can include an integrated circuit card 140, a tray 110, a connector 130 with connector pins 132, and a housing 120. The connector pins 132 electrically connect the integrated circuit card 140 to the mobile communication device. The tray 110 is configured to receive and hold the integrated circuit card 140. The integrated circuit card 140 can be a subscriber identity module (SIM). The SIM card can include one or more of a model number associated with the mobile communication device, a telephone number associated with the mobile communication device, and a service subscriber key. The housing 120 can be manufactured out of stainless steel. In an embodiment, the housing is configured such that upon attachment to the mobile communication device, the housing is flush with the mobile communication device. FIG. 6 illustrates an example embodiment of a mobile communication device 185.

Figure 5:
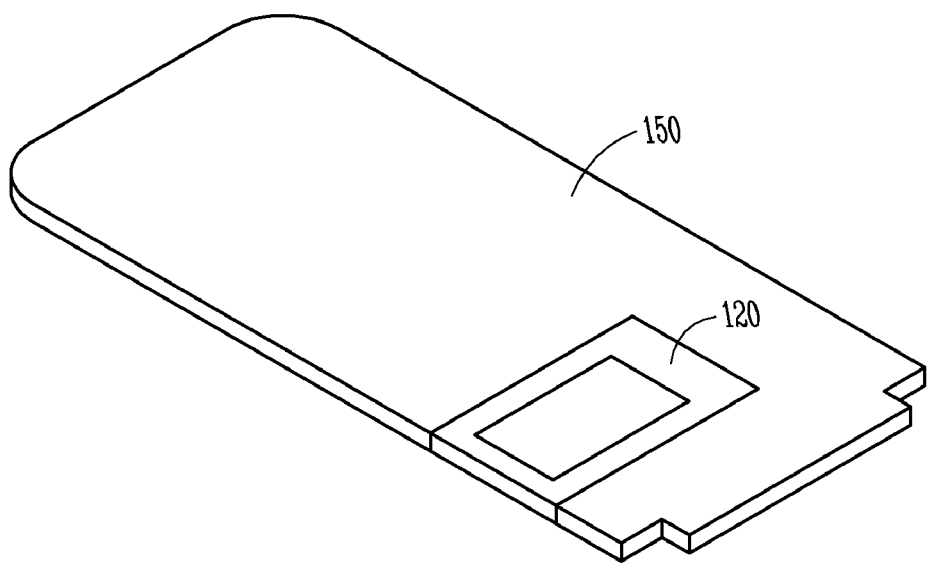
FIG. 5 illustrates a perspective view of an example embodiment of a lock positioned on a printed circuit board.
Figure 8:
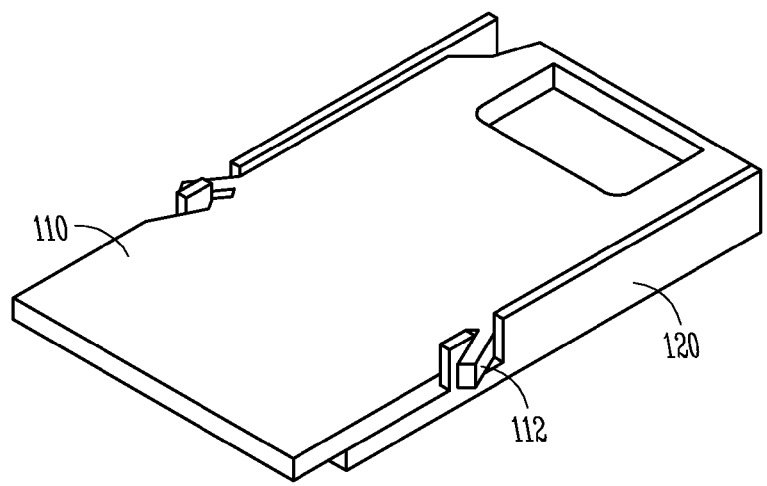
FIG. 8 illustrates a perspective view of another example embodiment of a lock for a mobile communication device.
Figure 9:
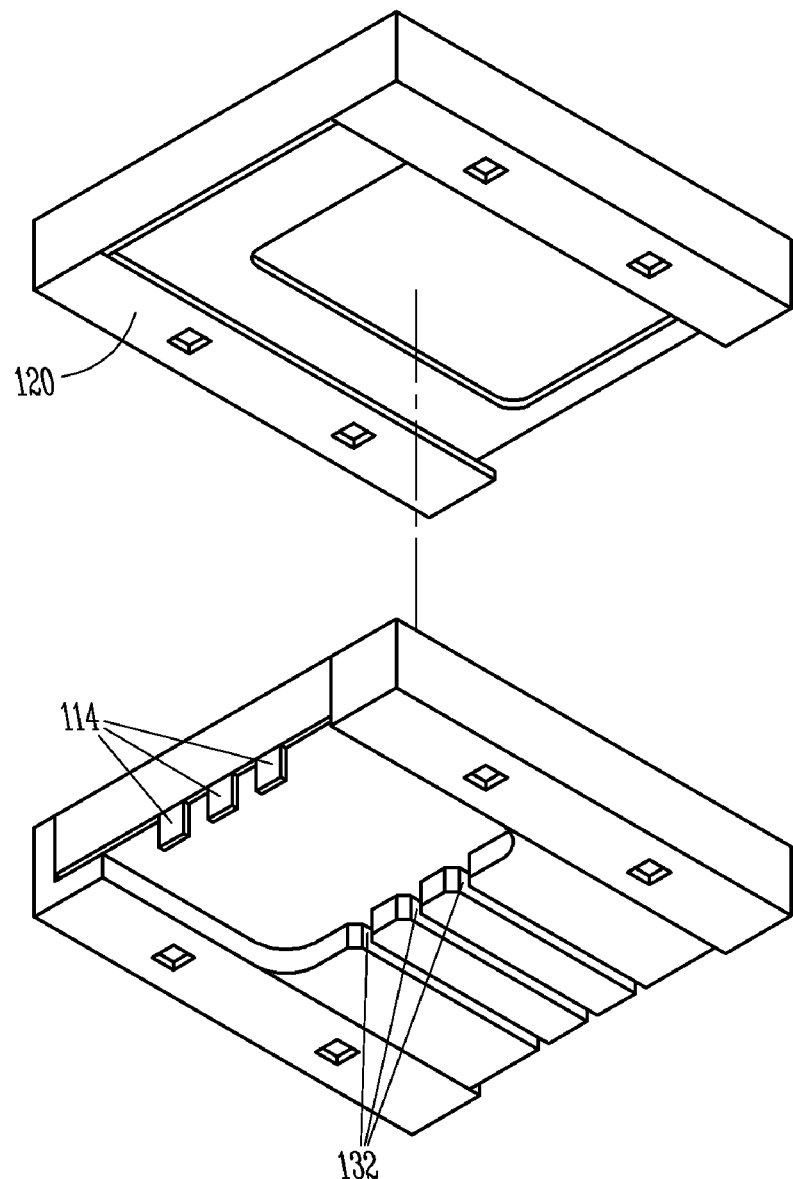
FIG. 9 illustrates an exploded view of another embodiment of a lock for a mobile communication device.

The housing 120 can be configured to attach to a mobile communication device 185 such as a cellular telephone. Specifically, as illustrated in FIG. 5, the housing 120 can attach to a printed circuit board 150 of a mobile communication device 185. In a particular embodiment, the housing 120 can be attached to an outer edge of the printed circuit board 150 adjacent an opening 175 in the mobile communication device 185, wherein the opening in the mobile communication device 185 is for receiving the tray 110 and the integrated circuit card 140. The connector 130 can be configured to couple the tray 110 and the integrated circuit card 140 to a mobile communication device 185. As shown in FIG. 8, the tray 110 can include one or more one way snaps 112 that are configured to lock the tray 110 and the integrated circuit card 140 to one or more of the connector 130, the housing 120, and the mobile communication device 185. The tray 110 can further include a means for engaging and damaging one or more leads 132 on the connector 130 when attempts are made to disengage the tray 110 and the integrated circuit card 140 from the connector 130. In an embodiment, as illustrated in FIG. 9, the means can include one or more tabs, protuberances, and/or other equivalent features 114.

Figure 2:
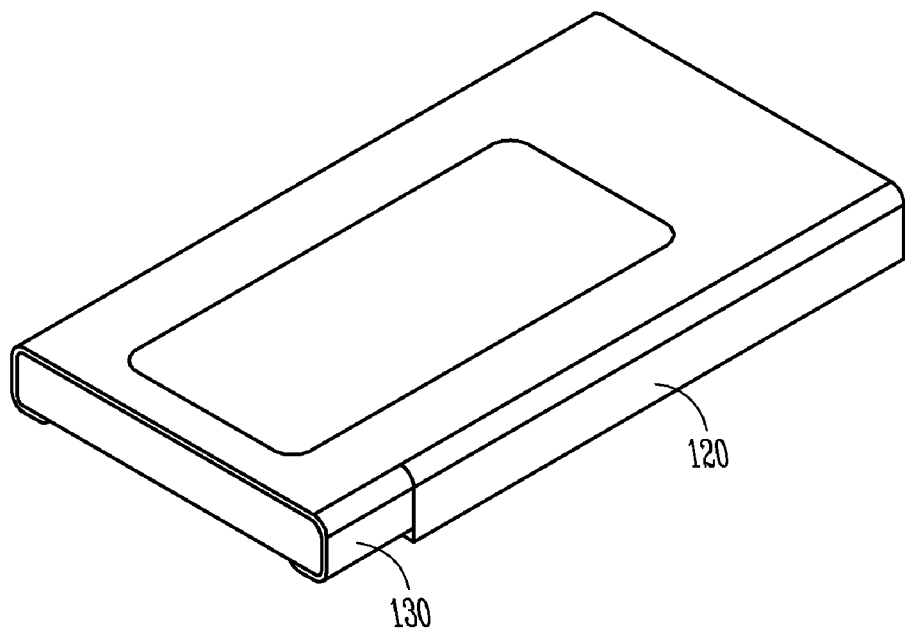
FIG. 2 illustrates a perspective view of an example embodiment of a lock for a mobile communication device.

FIG. 2 illustrates a lock 100 for a mobile communication device 185 in an assembled condition. Specifically, FIG. 2 illustrates the connector 130 coupled to the housing 120. The integrated circuit card 140 and the tray 110, not visible in FIG. 2, can be inserted into the housing 120 and connector 130.

Figure 3:
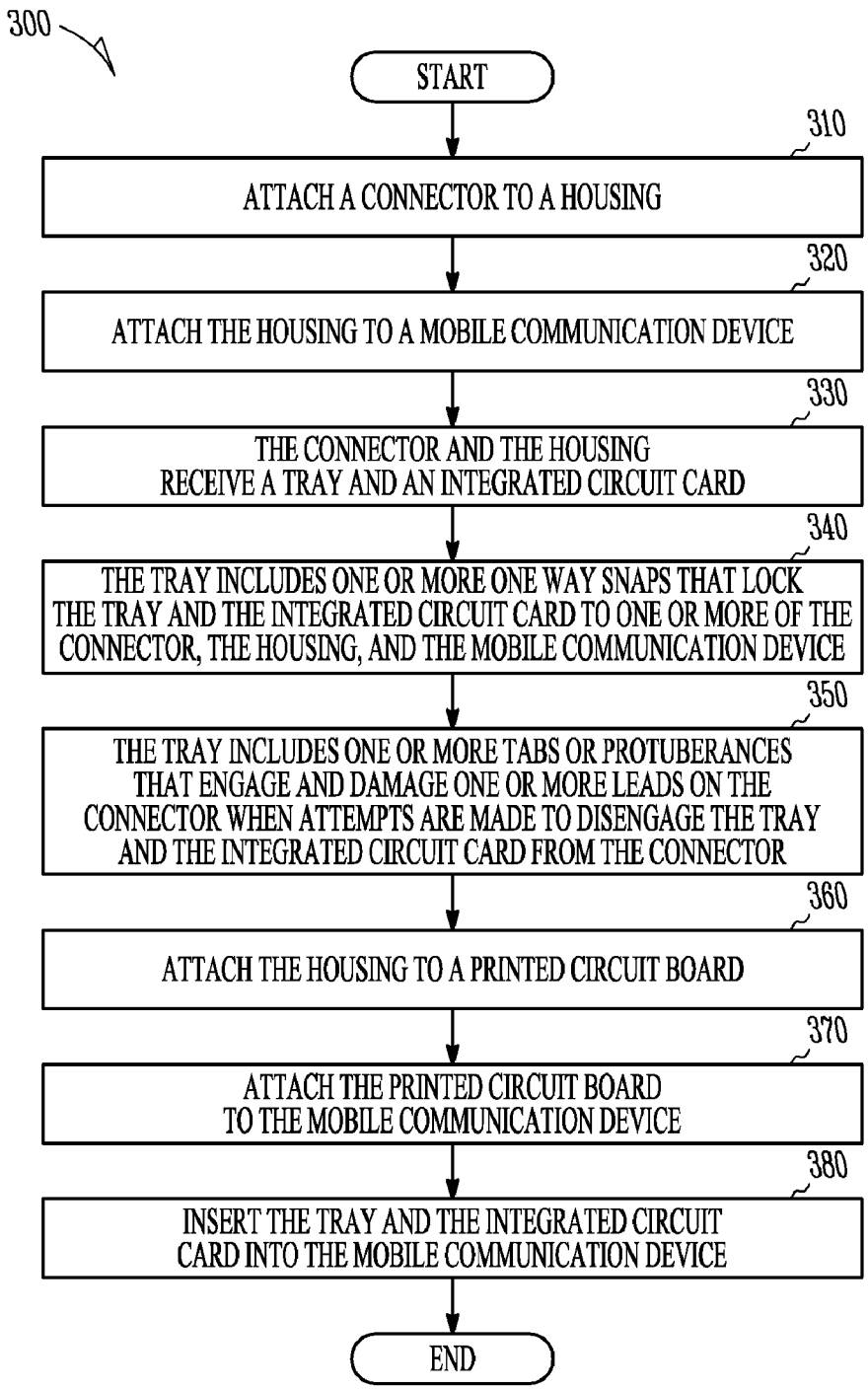
FIG. 3 illustrates a flowchart of an example process for integrating a lock into a mobile communication device.

FIG. 3 is a flowchart of an example process 300 for integrating a lock 100 with a mobile communication device 185. FIG. 3 includes a number of process blocks 310-380. Though arranged serially in the example of FIG. 3, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

At 310, the connector 130 is attached to the housing 120, and at 320, the housing 120 is attached to the mobile communication device 185. FIG. 6 illustrates an exploded view of the mobile communication device 185 that includes a top cover 160, a middle cover 170, a printed circuit board 150 including the housing 120, and a bottom cover 180. At 330, the connector 130 and the housing 120 receive the tray 110 and the integrated circuit card 140. At 340, the tray can include one or more one way snaps 112 that lock the tray 110 and the integrated circuit card 140 to one or more of the connector 130, the housing 120, and the mobile communication device 185. At 350, the tray includes one or more tabs or protuberances 114 that engage and damage one or more of the leads 132 on the connector 130 when attempts are made to disengage the tray 110 and the integrated circuit card 140 from the connector 130.

Figure 7:
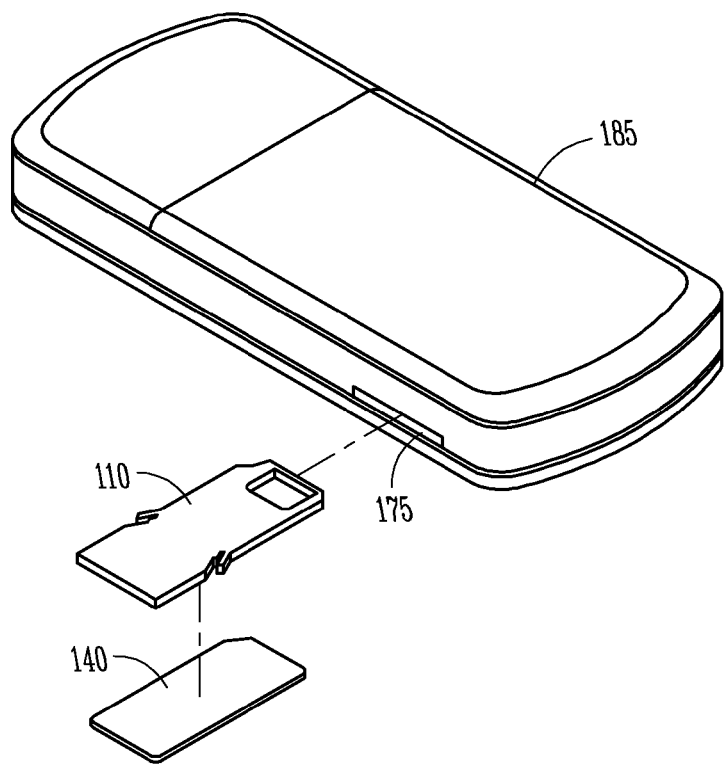
FIG. 7 illustrates a perspective view of an insertion of an integrated circuit card into a mobile communication device.

At 360, the housing is attached to the printed circuit board 150. At 370, the printed circuit board 150 is attached to the mobile communication device 185. At 380, the tray 110 and the integrated circuit card 140 are inserted into the mobile communication device 185. FIG. 7 illustrates the attachment of a integrated circuit card 140 to a tray 110, and the insertion of the tray 110 and the integrated circuit card 140 into the mobile communication device 185.

Figure 4:
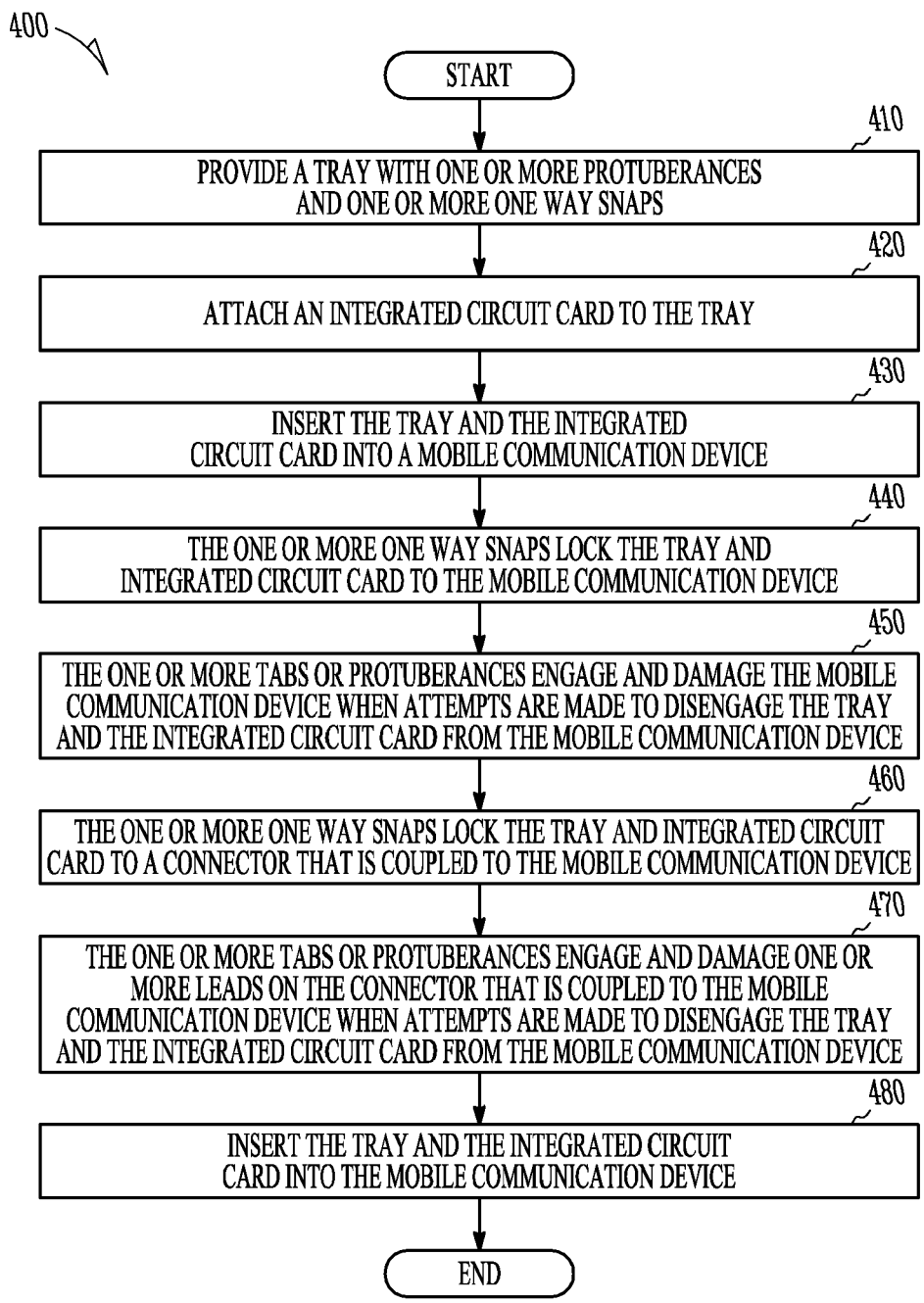
FIG. 4 illustrates a flowchart of an example process for integrating a lock into a mobile communication device.

FIG. 4 is a flowchart of an example process 400 for integrating a lock with a mobile communication device. FIG. 4 includes a number of process blocks 410-480. Though arranged serially in the example of FIG. 4, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

At 410, a tray 110 is provided with one or more tabs or protuberances 114 and one or more one way snaps 112. At 420, an integrated circuit card 140 is attached to the tray 110. At 430, the tray 110 and the integrated circuit card 140 are inserted into the mobile communication device 185. At 440, the one or more one way snaps 112 lock the tray 110 and the integrated circuit card 140 to the mobile communication device 185. At 450, the one or more tabs or protuberances 114 engage and damage the mobile communication device when attempts are made to disengage the tray 110 and the integrated circuit card 140 from the mobile communication device 185. At 460, the one or more one way snaps 112 lock the tray 110 and the integrated circuit card 140 to a connector 130 that is coupled to the mobile communication device 185. At 470, the one or more tabs or protuberances 114 engage and damage one or more leads 132 on the connector 130 that is coupled to the mobile communication device 185 when attempts are made to disengage the tray 110 and the integrated circuit card 140 from the mobile communication device 185. At 480, the tray 110 and the integrated circuit card 140 are inserted into the mobile communication device 185.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A system comprising:
   an integrated circuit card;
   a tray configured to receive the integrated circuit card;
   a connector comprising a slot; and
   a housing configured to receive the connector;
   wherein the housing is configured to attach to a mobile communication device;
   wherein the connector is configured to slidably receive the tray and to couple the tray and the integrated circuit card to the mobile communication device; and
   wherein the tray comprises one or more one way snaps configured to engage the connector slot and thereby to lock the tray and the integrated circuit card to one or more of the connector, the housing, and the mobile communication device.

2. The system of claim 1, wherein the tray comprises means for engaging and damaging one or more leads on the connector when attempts are made to disengage the tray and the integrated circuit card from the connector.

3. The system of claim 2, wherein the means for engaging and damaging one or more leads on the connector comprises one or more tabs or protuberances.

4. The system of claim 1, wherein the integrated circuit card comprises a subscriber identity module (SIM).

5. The system of claim 1, wherein the tray and the integrated circuit card are configured for insertion into the housing.

6. The system of claim 1, wherein the mobile communication device comprises a handheld device.

7. The system of claim 1, wherein the housing is configured to attach to a printed circuit board of the mobile communication device.

8. The system of claim 7, wherein the housing is configured to attach to an outer edge of the printed circuit board adjacent an opening in the mobile communication device, the opening in the mobile communication device for receiving the tray and the integrated circuit card.

9. The system of claim 1, wherein the housing comprises stainless steel or other hardened metal.

10. The system of claim 1, wherein the integrated circuit card stores information comprising a model number associated with the mobile communication device, a telephone number associated with the mobile communication device, and a service subscriber key.

11. The system of claim 1, wherein the housing is configured such that upon attachment to the mobile communication device, the housing is flush with a side edge of the mobile communication device.

12. The system of claim 1, further comprising the mobile communication device.

13. A process comprising:
attaching a connector comprising a slot to a housing; and
attaching the housing to a mobile communication device;
wherein the connector and the housing are configured to slidably receive a tray and an integrated circuit card and to couple the tray and the integrated circuit card to the mobile communication device; and
wherein the tray comprises one or more one way snaps configured to engage the connector slot and thereby to lock the tray and the integrated circuit card to one or more of the connector, the housing, and the mobile communication device.

14. The process of claim 13, wherein the tray comprises one or more tabs or protuberances configured to engage and damage one or more leads on the connector when attempts are made to disengage the tray and the integrated circuit card from the connector.

15. The process of claim 13, comprising:
attaching the housing to a printed circuit board; and
attaching the printed circuit board to the mobile communication device.

16. The process of claim 13, comprising inserting the tray and the integrated circuit card into the mobile communication device.

17. A process comprising:
providing a tray with one or more one way snaps; and
providing an integrated circuit card configured to attach to the tray;
wherein the tray and the integrated circuit card are configured for insertion in a mobile communication device; and
wherein the one or more one way snaps are configured to engage a slot of the mobile communication device and thereby to lock the tray and the integrated circuit card to the mobile communication device.

18. The process of claim 17, comprising providing the tray with one or more tabs or protuberances, wherein the one or more tabs or protuberances are configured to engage and damage the mobile communication device when attempts are made to disengage the tray and the integrated circuit card from the mobile communication device.

19. The process of claim 17, wherein the one or more one way snaps are configured to lock the tray and the integrated circuit card to a connector coupled to the mobile communication device.

20. The process of claim 18, wherein the one or more tabs or protuberances are configured to engage and damage one or more leads on a connector coupled to the mobile communication device when attempts are made to disengage the tray and the integrated circuit card from the mobile communication device.

21. The process of claim 17, comprising inserting the tray and the integrated circuit card into the mobile communication device.

22. A system comprising:
a first subsystem comprising:
a mobile communication device, the mobile communication device comprising a printed circuit board;
a housing coupled to the printed circuit board; and
a connector comprising a slot, the connector coupled to the housing; and
a second subsystem comprising:
an integrated circuit card; and
a tray for receiving the integrated circuit card, the tray comprising one or more one way snaps;
wherein the first subsystem is configured to slidably receive the second subsystem such that the one way snaps engage the connector slot and thereby lock the tray and the integrated circuit card to one or more of the connector, the housing, and the mobile communication device.

23. A system comprising:
an integrated circuit card; and
a tray configured to receive the integrated circuit card;
wherein the tray and the integrated circuit card are configured for insertion into a mobile communication device;
wherein the tray comprises one or more one way snaps configured to engage a slot of the mobile communication device and thereby to lock the tray and the integrated circuit card to the mobile communication device; and
wherein the tray comprises one or more tabs or protuberances configured to engage and damage one or more leads on the mobile communication device when attempts are made to disengage the tray and the integrated circuit card from the mobile communication device.

24. The system of claim 23, wherein the mobile communication device comprises:
a connector; and
a housing configured to receive the connector;
wherein the housing is configured to attach to the mobile communication device; and wherein the connector is configured to couple the tray and the integrated circuit card to the mobile communication device.

25. A system comprising:
a mobile communication device comprising:
 a connector comprising a slot; and
 a housing coupled to the connector;
wherein the connector is configured to slidably receive and couple a tray to the mobile communication device;
wherein the tray comprises one or more one way snaps configured to engage the connector slot and thereby to lock the tray to one or more of the connector, the housing, and the mobile communication device;
wherein the tray comprises one or more tabs or protuberances configured to engage and damage one or more leads on the connector when attempts are made to disengage the tray from the connector; and
wherein the connector is configured to receive and couple an integrated circuit card to the mobile communication device.

* * * * *

UNITED STATES PATENT AND TRADEMARK OFFICE
CERTIFICATE OF CORRECTION

PATENT NO. : 7,980,876 B2
APPLICATION NO. : 12/015837
DATED : July 19, 2011
INVENTOR(S) : Annappa Bombale et al.

It is certified that error appears in the above-identified patent and that said Letters Patent is hereby corrected as shown below:

On the Title page, in field (54), in "Title", in column 1, lines 1-2, delete "LOCK FOR MOBILE COMMUNICATION EQUIPMENT" and insert -- SIM/IC CARD LOCK FOR A MOBILE COMMUNICATION DEVICE --, therefor.

In column 1, lines 1-2, delete "LOCK FOR MOBILE COMMUNICATION EQUIPMENT" and insert -- SIM/IC CARD LOCK FOR A MOBILE COMMUNICATION DEVICE --, therefor.

In column 5, line 28, in Claim 9, delete "steel or other hardened metal." and insert -- steel. --, therefor.

Signed and Sealed this
Thirtieth Day of August, 2011

David J. Kappos
*Director of the United States Patent and Trademark Office*